United States Patent
Bortz et al.

(10) Patent No.: US 7,150,462 B2
(45) Date of Patent: Dec. 19, 2006

(54) WHEEL GUIDE ARRANGEMENT FOR A STEERED MOTOR VEHICLE WHEEL

(75) Inventors: Joachim Bortz, Stuttgart (DE); Andreas Gaupp, Waldenbuch (DE); Wolfgang Mödinger, Weinstadt (DE)

(73) Assignee: DaimlerChrysler AG, Stuttgart (DE)

( * ) Notice: Subject to any disclaimer, the term of this patent is extended or adjusted under 35 U.S.C. 154(b) by 413 days.

(21) Appl. No.: 10/851,627

(22) Filed: May 22, 2004

(65) Prior Publication Data
US 2004/0232645 A1 Nov. 25, 2004

(30) Foreign Application Priority Data
May 23, 2003 (DE) .............................. 103 23 262

(51) Int. Cl.
*B60G 3/18* (2006.01)
*B62D 7/18* (2006.01)

(52) U.S. Cl. ..................... 280/124.125; 280/124.135; 280/93.511

(58) Field of Classification Search ......... 280/124.125, 280/124.126, 124.135, 124.15, 93.511, 93.512
See application file for complete search history.

(56) References Cited

U.S. PATENT DOCUMENTS

| | | | | |
|---|---|---|---|---|
| 2,971,770 A | * | 2/1961 | Wagner | 280/124.134 |
| 2,998,262 A | * | 8/1961 | Hoffman | 280/124.136 |
| 3,039,787 A | * | 6/1962 | Meyer | 280/124.136 |
| 4,722,540 A | * | 2/1988 | Kozyra et al. | 280/124.136 |
| 5,022,673 A | * | 6/1991 | Sekino et al. | 280/124.138 |
| 5,782,484 A | * | 7/1998 | Kuhn, Jr. | 280/124.142 |
| 6,105,984 A | * | 8/2000 | Schmitz et al. | 280/124.136 |
| 6,308,970 B1 | * | 10/2001 | Stuart | 280/86.756 |
| 6,398,240 B1 | * | 6/2002 | Taylor | 280/93.512 |
| 6,860,498 B1 | * | 3/2005 | McGaughy | 280/93.51 |

FOREIGN PATENT DOCUMENTS

| | | |
|---|---|---|
| DE | 42 07 856 | 9/1993 |
| DE | 42 42 815 | 6/1995 |

* cited by examiner

Primary Examiner—Paul N. Dickson
Assistant Examiner—Laura B. Rosenberg
(74) Attorney, Agent, or Firm—Klaus J. Bach

(57) ABSTRACT

In a wheel guide arrangement of a steered motor vehicle wheel which has control arms and a steering knuckle, and wherein the steering knuckle includes a reception structure for a wheel mount and also connecting areas for the mounting of stubs of ball joints connected to the wheel control arms, the connecting areas are disposed at different distances from the wheel axis and the ball joints are arranged between the connecting areas and the wheel axis of rotation, that is, above the connecting areas.

10 Claims, 3 Drawing Sheets

WHEEL GUIDE ARRANGEMENT FOR A STEERED MOTOR VEHICLE WHEEL

BACKGROUND OF THE INVENTION

The invention relates to a wheel guide arrangement for a steered motor vehicle wheel, having wheel support arms and an axle stub including a reception structure for rotatably supporting the wheel and connecting structures for mounting ball bearing joints to which the support arms are connected.

A wheel guide arrangement of this type is known from DE 42 07 856 A1. This arrangement includes a wheel suspension for steerable motor vehicle wheels, wherein lower transverse support arms are connected to a wheel carrier via ball joints which are arranged at approximately the same level.

DE 42 42 815 A1 discloses a vehicle suspension in which a lower tranverse arm and a lower longitudinal arm are connected to a wheel carrier in an articulated manner each in a connection area. Also, in this instance, the connection areas are arranged in the same horizontal plane.

It is the object of the present invention to provide a wheel support arrangement requiring a relatively low steering force.

SUMMARY OF THE INVENTION

In a wheel guide arrangement of a steered motor vehicle wheel which has control arms and a steering knuckle with a reception structure for a wheel mount and also connecting areas for the mounting of stubs of ball joints connected to the wheel control arms, the connecting areas are disposed at different distances from the wheel axis and the ball joints are arranged between the connecting areas and the wheel axis, that is, above the connecting areas.

The fundamental concept of the invention is to provide a connecting arrangement for the connecting points of the control arms via which the arms are connected to an axle stub at different distances from the axis of rotation of the vehicle wheel. The ball joints are arranged between the connecting point and the wheel axis, or the connecting points are arranged between the wheel axis and the ball joints.

As a result, in a downward projection onto a horizontal plane, the connecting points of the arms to the steering knuckle can be close to one another, so that there is a small coupling distance between the joints. As a result, only relatively low steering forces are required.

Also, the support arms together with their connections to the steering knuckle, have a low overall heights so that, for example, sufficient ground clearance is ensured. It is likewise possible to use this wheel guide arrangement also for driven steered vehicle wheels, since the type of arm connection provides sufficient free space for a drive shaft leading to the wheels.

In a refinement of the invention, the connecting points are at different distances from an approximately vertical wheel center plane extending in the direction of travel of a vehicle wheel. Likewise, the connecting point which is closer to the wheel axis may be arranged in the direction of travel in front of the wheel axis. In addition to kinematic benefits during steering or during the upward and downward stroke of the vehicle wheel, these structural arrangements have the advantage that the bearing journals of the ball joints of the two arms can extend essentially in the same direction and, nevertheless, sufficient construction space is available for connecting the bearing journals operatively to the connecting structure. These connections are expediently designed to be releasable, for example in the form of screw connections.

The invention will become more readily apparent from the following description of preferred embodiments of the invention with reference to the accompanying drawings.

DESCRIPTION OF PREFERRED EMBODIMENTS OF THE INVENTION

In the following description, identical or similar components are indicated by the same reference symbols.

Figure 1:
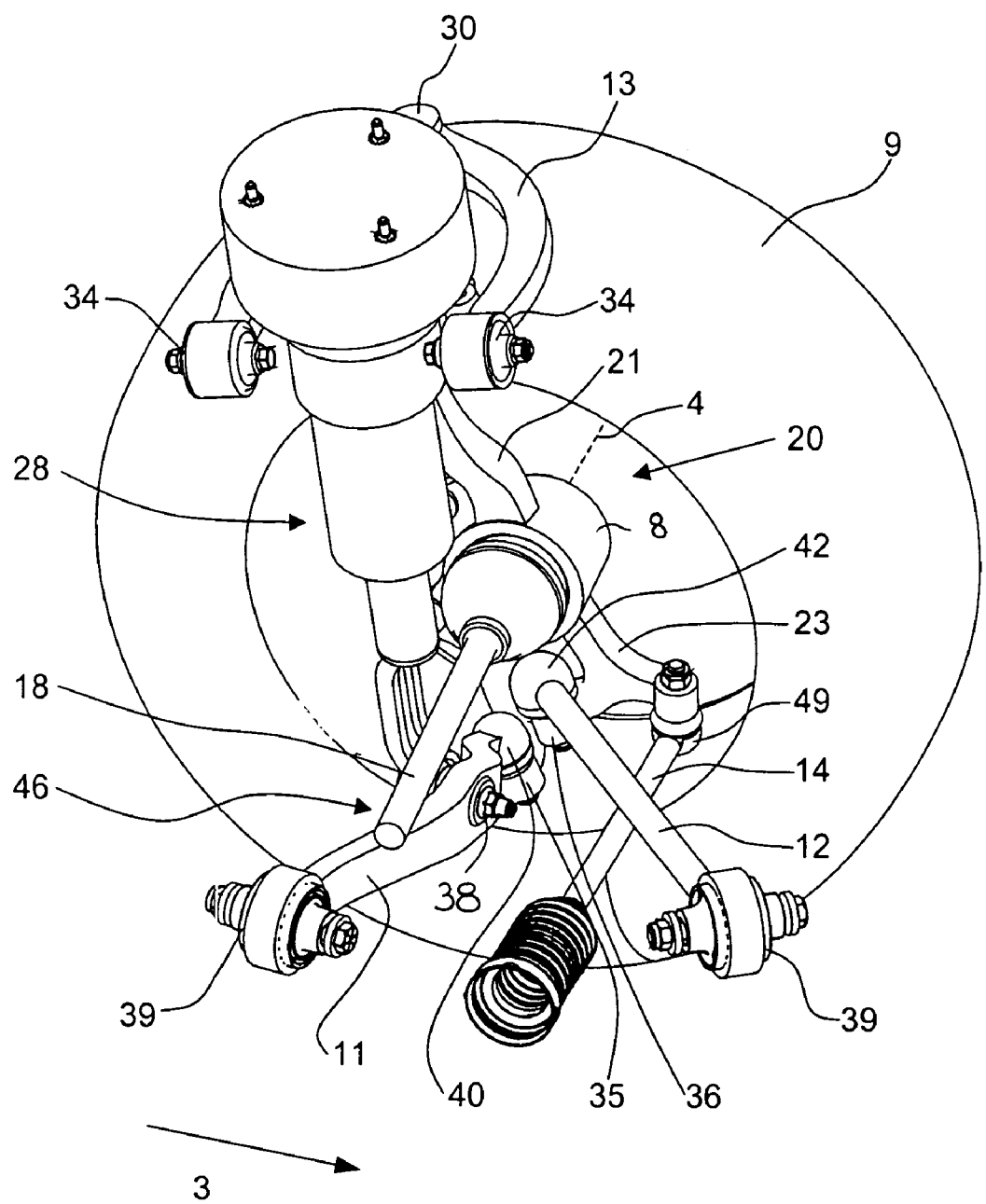
FIG. 1 is a perspective view of a wheel suspension of a driven steerable left front wheel of a motor vehicle.

FIG. 1 is a perspective view of a wheel suspension of a driven steerable left front wheel 9 of a motor vehicle. The vehicle wheel 9 is mounted rotationally movably in a (concealed) reception structure 8 for a wheel mount of steering knuckle 20.

Above the reception structure 8, the steering knuckle 20 is curved in the form of a goose neck 21. At the upper end of the goose neck 21, the steering knuckle 20 is connected to a wishbone 13 in an articulated manner via an upper ball joint 30. The other two ends of the wishbone 13 are supported pivotably movably on the vehicle body or frame, (not illustrated) of the motor vehicle via bearings 34, for example rubber bearings or hydraulic bearings.

Below the reception structure 8, the steering knuckle 20 has two connecting structures 35, 36 for the connection of two lower transverse control arms 11, 12 to the steering knuckle 20 via ball joints 40, 42. The connecting structures 35, 36 will be described in more detail in the course of the description of FIGS. 2 to 5.

At the ends of the lower control arms 11, 12, opposite the steering knuckle 20, the lower control arm 11, 12 are mounted on the body or frame of the vehicle, (not illustrated) via rubber or hydraulic bearings 39. The lower transverse control arm 11 at the rear in the direction of travel 3 is connected in a bend area 46 via a joint 38 to a spring strut 28, which is gimbal mounted at the upper end thereof to the body or frame (not illustrated) of the vehicle.

The embodiment illustrated in FIG. 1 relates to a wheel suspension of a vehicle with driven front wheels 9. Consequently, a drive shaft 18 is mounted, on the one hand, in the reception structure 8 of the steering knuckle 20 and, on the other hand, to a power divider, not illustrated. The drive shaft 18 in this case extends approximately coaxially with the axis of rotation 4 of the wheel 9.

The steering knuckle 20 has formed on it a steering lever 23 which extends in front of the wheel axis 4 predominantly in the direction of travel 3 and at which a tie rod 14 of a steering device, (not illustrated) is connected to the steering knuckle 20 via a further joint 49.

Figure 2:
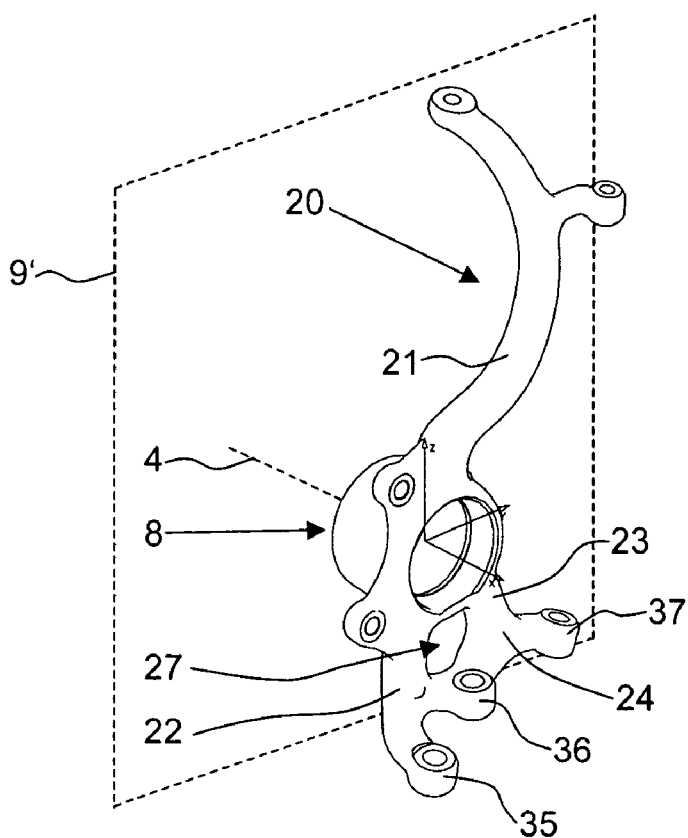
FIG. 2 is a perspective view of a steering knuckle.

FIG. 2 illustrates the steering knuckle 20 without the adjoining components. The reception structure 8 of the steering knuckle 20 is of tubular design and is oriented coaxially with the wheel axis 4. A wheel bearing with an axle journal and also the drive shaft 18, via which a drive torque can be transmitted to the wheel 9, can be mounted within the tubular portion.

Below the reception structure 8, two finger-shaped extensions 22, 23 extend radially downwards and rearwards respectively and at a slight inclination in the direction toward the vehicle center. The latter extension 23, which forms a steering lever, is preferably bent at half its length or in its lower third so as to extend somewhat horizontally. A mounting structure 37 in the form of a bore for the ball-joint 49 of the tie rod 14 is provided in the end region of this finger-like extension 23.

A connecting web 24 extends between the two extension fingers 22, 23. The rigidity of the fingers 22, 23 is thereby increased. The reception structure 8, the two fingers extension 22, 23 and the web 24 delimit a triangular or window-like opening 27.

The first finger-like extension 22, which extends directly below the reception structure, is angled in its lower quarter in the direction toward the vehicle center and in its end region has a connecting area 35 including a bore for the jointed connection of the rear lower control arm 11 of the wheel suspension.

The web 24 is provided between the two finger-like extensions 22, 23 with a connecting area 36, wherein the lower front control arm 12 can be mounted. This connecting area 36 is at a shorter distance from a wheel center plane 9', extending approximately vertically through the center of the vehicle wheel 9 and in the direction of travel 3, than the connecting area 35 of the rear lower control arm 11.

Figure 3:
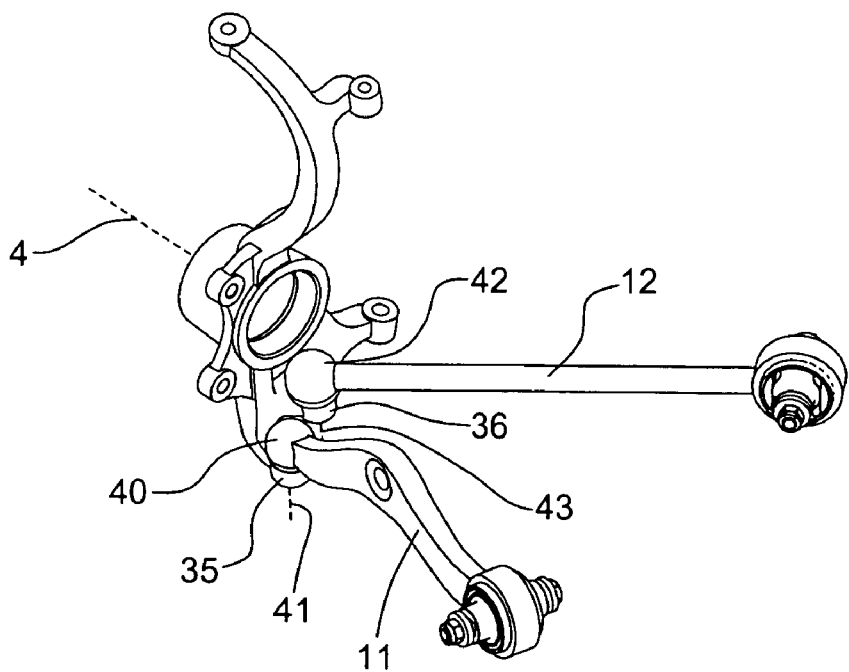
FIG. 3 is a perspective view of a wheel support arrangement according to the invention.

FIG. 3 illustrates an alternative embodiment of the steering knuckle 20 according to the invention. It likewise illustrates the lower control arms 11, 12 connected at the connecting areas 35, 36. The ball joints 40, 42 mounted at the ends of the control arms 11, 12 adjacent the steering knuckle 20 are arranged above the connecting areas 35, 36, that is to say between the respective connecting areas 35, 36 and the wheel axis 4. The lugs 41, 43 of the ball joints 40, 42, which are illustrated in FIG. 3 by dash-and-dotted lines, are mounted radially in the bores of the connecting areas 35, 36 and are connected non-positively and positively to the steering knuckle 20 below the respective connecting areas 35, 36, for example, via screw connections illustrated only in FIG. 4 and FIG. 5.

The advantage of this arrangement is that the control arms 11, 12 are connected to the steering knuckle 20 from above, and therefore, the control arms 11, 12 are at a greater distance from a tire contact area that is the street or wheel support area below the steering knuckle 20 than they would be if the control arms 11, 12 were connected at the connecting areas 35, 36 from below. The control arms 11, 12 can thus also have smaller horizontal bends, with the result that the weight of the control arms 11, 12 can be reduced because of a smaller material thickness and therefore the weight and manufacturing costs can be reduced.

Figure 4:
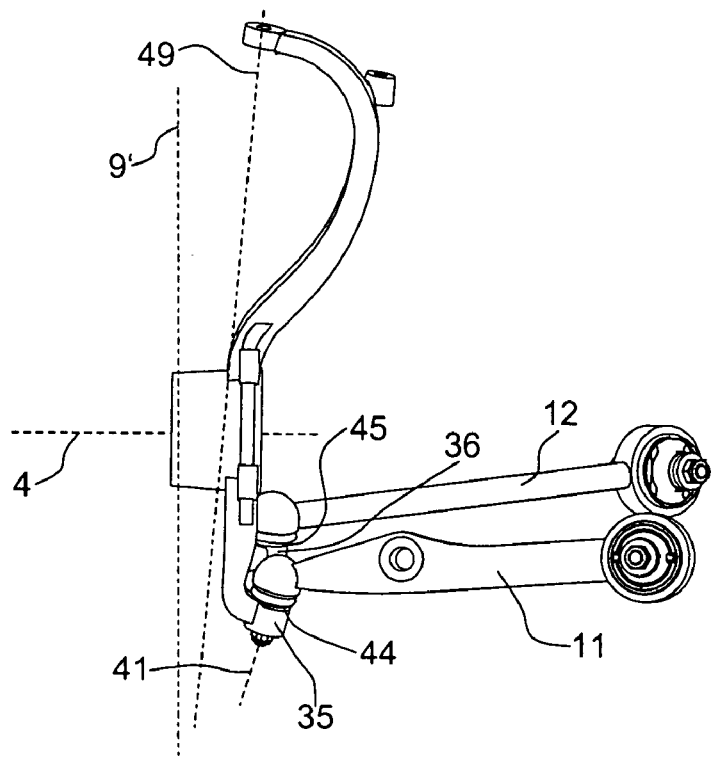
FIG. 4 shows a wheel support arrangement according to FIG. 3 viewed in the direction of travel.
Figure 5:
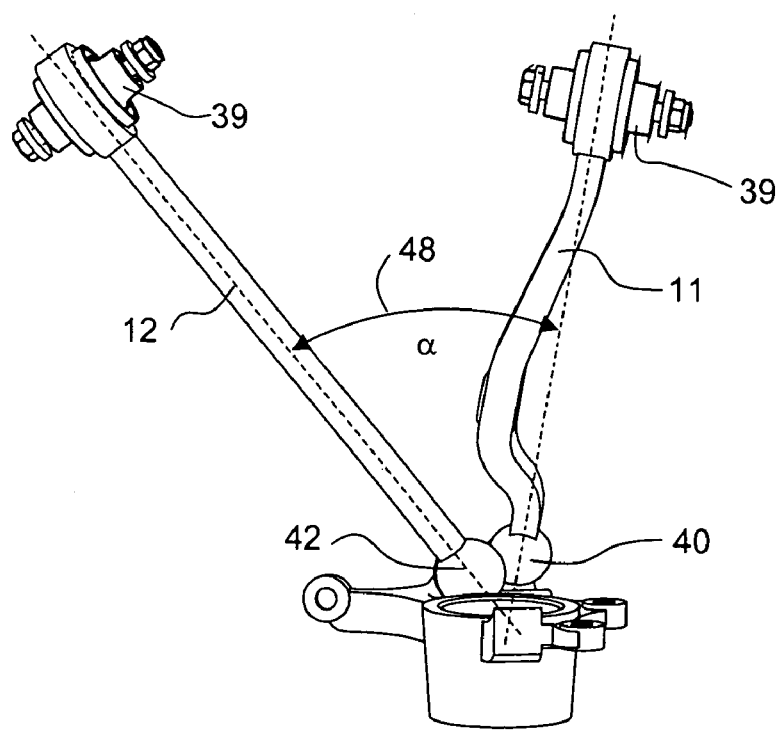
FIG. 5 is a top view of a wheel guide arrangement according to FIG. 3.

FIG. 4 and FIG. 5 show other views of the embodiment illustrated in FIG. 3. Thus, FIG. 4 shows a rear view of the steering knuckle 20 in the direction, of travel 3 (FIG. 1). The bearing surfaces 44, 45 of the connecting areas 35, 36 of the lower control arms 11, 12, which bearing surfaces are inclined with respect to the wheel axis 4, can be clearly seen. The different distances of the connecting areas 35, 36 from the wheel center-plane 9' are likewise shown in FIG. 4. As a result, the bearing surfaces 44, 45 and the bores in the connecting areas 35, 36 can be manufactured in a simple way, since they are easily accessible for machine tools.

It can be seen in the top view according to FIG. 5 that the silhouettes of the two ball joints 40, 42 lying in different planes overlap one another. The location of the point of intersection of the longitudinal axes connecting the two bearings (39, 40, 39, 42) of each control arm 11, 12 can be determined via the angle α 48 at which the two lower control arms 11, 12 are disposed in relation to one another in a vertical projection. This intersection forms a lower center of rotation for the steering knuckle 20. A connecting line between this lower center of rotation and the center of the upper ball joint 30 at the upper end of the steering knuckle 20 forms a pivot axis 49, about which the steering knuckle 20 with the wheel 9 is pivoted during displacement of the tie-rod 14 that is during steering. When the pivot axis 49 extends near the wheel center-plane 9', the disturbing-force lever arm, as it may be referred to, and what is known as the steering roll radius are low, that is to say driving or braking forces acting on the wheel result only in a low torque about the pivot axis.

Since the connecting areas 35, 36 of the two lower control arms 11, 12 are spaced only slightly apart from one another in the direction of travel 3, the two control arms 11, 12 are pivoted only slightly out of their normal position during a steering operation. This results in smaller differences in the camber and wheel inclination between the inside and the outside wheel when the vehicle is negotiating a curve. Also, during steering, the displacement of the wheel contact area in the vehicle transverse direction is low, with the result that only a relatively low steering force is required.

What is claimed is:

1. A wheel guide arrangement for a steered motor vehicle wheel supported by control arms connected to a steering knuckle, said steering knuckle having:
   a reception structure for rotatably mounting the motor vehicle wheel about a wheel axis (4) and
   connecting areas (35, 36) for the mounting of mounting stubs of ball joints connected to the control arms,
   said connecting areas (35, 36) being disposed in different horizontal planes and at different distances from the wheel axis (4), and
   ball joints (40, 42) mounted in said connecting areas (35, 36) so as to be disposed between the wheel axis of rotation (4) and the connecting areas (35, 36).

2. A wheel guide arrangement according to claim 1, wherein the connecting areas (35, 36) with said ball joints (40, 42) are at different distances from an approximately vertical wheel center plane (9') of the vehicle wheel (9).

3. A wheel guide arrangement according to claim 2, wherein the connecting area (36) which is disposed at a shorter distance from the wheel axis (4), is arranged in front of the wheel axis (4) in the direction of vehicle travel (3).

4. A wheel guide arrangement according to claim 3, wherein a connecting web (24) is provided between the tie rod (14) and the connecting areas (35, 36) closest to the tie rod (14).

5. A wheel guide arrangement according to claim 2, wherein the connecting area (35) which is at the longer distance from the wheel axis of rotation (4) is arranged behind the wheel axis (4) in the direction of travel (3), that is, behind a plane extending vertically through the wheel axis (4).

6. A wheel guide arrangement according to claim 1, wherein the ball joints (40, 42) are mounted on the steering knuckle (21) in each case by mounting means disposed on that side of the connecting area (35, 36) which faces away from the wheel axis (4).

7. A wheel guide arrangement according to claim 1, wherein said steering knuckle (20) extends downwardly in the form of a finger and approximately radially to the wheel axis (4) below the reception structure (8), and the connecting areas (35, 36) are arranged on extensions projecting angularly from said steering knuckle (20).

8. A wheel guide arrangement according to claim 1, wherein the connecting areas (35, 36) are inclined with respect to the wheel axis (4).

9. A wheel guide arrangement according to claim 8, wherein the longitudinal axes of the ball joint stubs (41, 43) extend askew to one another.

10. A wheel guide arrangement according to claim 1, wherein the steering knuckle (21) includes a tie rod lever (23), on which a tie rod (14) can be mounted, the tie-rod lever (23) being arranged in front of the wheel axis (4) in the direction of travel (3).

\* \* \* \* \*